United States Patent
Berger et al.

(10) Patent No.: US 10,604,694 B1
(45) Date of Patent: Mar. 31, 2020

(54) PROCESS AND COMPOSITION FOR SAND AND PROPPANT FLOWBACK

(71) Applicants: Paul Daniel Berger, Sugar Land, TX (US); Christie Huimin Berger, Sugar Land, TX (US)

(72) Inventors: Paul Daniel Berger, Sugar Land, TX (US); Christie Huimin Berger, Sugar Land, TX (US)

(73) Assignee: OiL CHEM TECHNOLOGiES, INC., Sugar Land, TX (US)

( * ) Notice: Subject to any disclaimer, the term of this patent is extended or adjusted under 35 U.S.C. 154(b) by 0 days.

(21) Appl. No.: 16/350,964

(22) Filed: Feb. 6, 2019

(51) Int. Cl.
*C09K 8/575* (2006.01)
*C09K 8/28* (2006.01)
*C09K 8/80* (2006.01)
*E21B 33/13* (2006.01)

(52) U.S. Cl.
CPC ............. *C09K 8/5756* (2013.01); *C09K 8/28* (2013.01); *C09K 8/5753* (2013.01); *C09K 8/5755* (2013.01); *C09K 8/80* (2013.01)

(58) Field of Classification Search
CPC ..... C04B 28/02; C04B 14/06; C04B 2103/44; C09K 8/035; C09K 8/62; C09K 2208/08; C09K 2208/26; C09K 8/467; C09K 8/68; E21B 43/26; E21B 43/267; E21B 33/138; E21B 33/14; E21B 33/13

See application file for complete search history.

(56) References Cited

U.S. PATENT DOCUMENTS

| | | | |
|---|---|---|---|
| 3,976,140 A | 8/1976 | Shaughnessy et al. | |
| 4,000,781 A | 1/1977 | Knapp | |
| 5,522,460 A | 6/1996 | Shu | |
| 6,311,773 B1 | 11/2001 | Todd et al. | |
| 7,975,764 B2 | 7/2011 | Sullivan et al. | |
| 9,567,511 B2 | 2/2017 | Wadekar et al. | |
| 2003/0230431 A1 | 12/2003 | Reddy et al. | |
| 2014/0311743 A1 | 10/2014 | Vo et al. | |
| 2014/0311745 A1 | 10/2014 | Vo et al. | |
| 2016/0264833 A1* | 9/2016 | Stone | C09K 8/035 |

* cited by examiner

*Primary Examiner* — Zakiya W Bates

(57) ABSTRACT

Compositions and a process for consolidating sand, proppant and other suspended particles present in a subterranean reservoir using an aqueous emulsion particle consolidation system. Surfactants with cloud points below the reservoir temperature are used to make a low viscosity aqueous external emulsion system with resin and curing agent as the internal phase. As the surfactant reaches its cloud point, it loses its emulsification ability and release the resin and curing agent to consolidate the sand. The aqueous phase of the system then functions as spacer to maintain the permeability needed for oil and gas production without additional post flush needed.

7 Claims, 4 Drawing Sheets

PROCESS AND COMPOSITION FOR SAND AND PROPPANT FLOWBACK

FIELD OF THE INVENTION

This present invention relates to the field of petroleum production. More specifically it relates to compositions and a process for consolidating sand, proppant and other particles present in subterranean formations that may interfere with the production of oil, gas, and/or water.

BACKGROUND OF THE INVENTION

Figure 1:
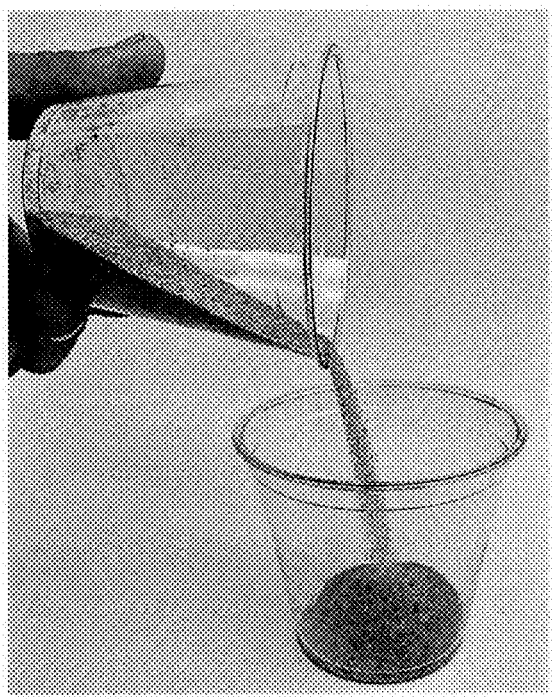
FIG. 1 Sand added to the mixture and stirred to obtain a homogenous mixture.

During the production of oil and gas, undesirable production of sand, proppants, formation fines and other contaminates may be produced with the oil and gas from the reservoir or from the proppant beds placed during the fracturing applications. The sand, proppants and formation fines may cause problems such as reduced production, plugged pathways, abrasion of production equipment, additional handling cost and refinery problems.

Several methods have been proposed and described in the prior art to help overcome this problem. These include, but are not limited to, controlling the migration and flowback of unconsolidated particles by gravel packing. Another method uses single layer or multiple layers of screens that filters out the particles before they are produced with the oil and gas. Another method is to treat the unconsolidated material with a consolidating agent that stabilizes the particles within the reservoir.

U.S. Pat. No. 9,494,026 discloses a method of treating a subterranean formation comprising a solvent-based treatment fluid with the reaction product of a multifunctional electrophilic compound containing at least two electrophilic reactive groups and at least one nucleophilic compound. U.S. Pat. No. 9,494,026 discloses gravel packing and also points out that the gravel pack may migrate along with producing fluids, thus contributing to the problem.

U.S. 2003/0230431 discloses the use of a drilling fluid comprised of water, a polymeric cationic catalyst which is adsorbed on weak zones or formations formed by unconsolidated clays, shale, sand stone and the like, a water soluble or dispersible polymer which is cross-linked by a thermoset resin and causes the resin to be hard and tough when cured, a particulate curable solid thermoset resin, a catalyst for curing the solid and water soluble resins. This disclosure employs the use of solid particles in the injection fluid and takes advantage of the effect of heat from the subterranean reservoir to melt the particulate resin and be cured.

U.S. Pat. No. 3,976,140 discloses a method of consolidating incompetent subterranean formation surrounding a well wherein a liquid resin diluted with a two-part diluent is injected into the formation and is followed by an over flush liquid to extract the diluent but leave the resin on the sand grains. The two-part diluent comprises a first component miscible with the resin and a second component immiscible with the resin but miscible with the first component and the over flush liquid.

U.S. Pat. No. 9,567,511 discloses a method of introducing a treatment fluid comprising a solvent-based fluid and a consolidation composition into a wellbore in a subterranean formation, the consolidation comprising, a crosslinking diverting agent, a hardening agent, and a multifunctional epoxy resin, the multifunctional epoxy resin comprising at least three epoxy groups; coating a face of the subterranean formation with the consolidation composition; and at least partially curing the consolidation composition in the wellbore, to reduce production of unconsolidated particulates from the subterranean formation into the wellbore.

U.S. Pat. No. 7,975,764 discloses a sand consolidation system and a method for use of the system. The consolidation system includes an emulsion having an oil phase and an aqueous phase, wherein the emulsion contains a source of insoluble silica particles and a source of calcium hydroxide, wherein the calcium hydroxide particles are present in the oil phase, and the insoluble silica particles are contained in the aqueous phase. Both types of particles must have average particle sizes which will fit into the pores of the formations.

U.S. Pat. No. 6,311,773 discloses improved hardenable resin compositions, and methods of consolidating particulate solids in subterranean zones penetrated by well bores. The resin compositions of this invention are basically comprised of a hardenable organic resin, an aminosilane resin-to-particulate solid coupling agent, a viscous carrier fluid breaker for breaking separating films of viscous carrier fluid between resin coated particulate solids and a surface active agent for causing the resin composition to flow to the contact points between the resin coated particulate solids.

U.S. Pat. No. 5,522,460 discloses a method for water compatible chemical in situ consolidation with oil soluble furan resin. The placement of the fluid is by phase separation rather than by conventional fluid displacement. The method uses the injection of resin/water miscible organic solvent solution followed by a spacer volume of water and acid catalyst injection.

U.S. Pat. No. 4,000,781 discloses using resin coated particles in a remote location, such as a subterranean reservoir or a sand or gravel pack, by contacting them with a cationic aqueous emulsion which contains a resin-forming mixture of poly epoxide and a relatively water-soluble tertiary-amine that is capable of both catalyzing the polymerization of the poly epoxide and oil-wetting of solid surfaces.

SUMMARY OF THE INVENTION

The present invention is designed to alleviate the problems encountered with previous art described in the literature and employed in the field. It can prevent proppant, gravel and sand from migrating out of the reservoir and from screens and gravel packs. It also eliminates the use of volatile solvents or environmentally hazardous solvents. Furthermore, unlike most prior art related to the subject, the present invention does not require a post flush to dilute or remove residual resin and curing agent from the treated reservoir.

The present invention involves a water external emulsion with resin and curing agent as the internal phase. The water based external phase including a surfactant(s) that has a cloud point lower than the reservoir temperature to form the emulsion at the surface and to delay the reaction of the resin and curing agent until the emulsion is delivered to the treatment area and heated to the cloud point of the surfactant. When the surfactant reaches or exceeds its cloud point it loses its emulsifying property and releases the resin and curing agent to consolidate the sand, proppants or any other material need to be consolidated. The water acts as a spacer to maintain the permeability required for oil/gas production. Unlike most prior art related to the subject, post flush is not needed in the present invention to remove the extra resin/curing agent in order to maintain the permeability of the treated area.

The present invention has the following advantages:

High flash point, solvent free. Environmentally friendly and safe for operations.

Economical. Use only ~30-60% active resin/curing agent in water external emulsion system. The water external emulsion phase functions as a carrier to carry the resin/curing agent to the reservoir, it also act as a built-in spacer to maintain the permeability of the reservoir and minimize damage due to the resin/curing agent treatment, so post flush to remove the extra resin/curing agent is not required.

Low injection viscosity and low injection pressure.

Versatile with adjustable pumping time and set up time.

Post flush is only required to flush the material out of the tubing and the injection coil tubing. It is not required to post flush the treated formation.

Differing from other aqueous based sand consolidation systems, the present invention is an aqueous emulsion particle consolidation system that involves a unique surfactant or mixture of surfactants chosen to have a cloud point below the temperature of the reservoir being treated. The cloud point is defined as the temperature at which the water soluble surfactant becomes insoluble and may result in phase separation and instability and loss of its surfactant performance. Generally, nonionic surfactants show optimal effectiveness when used near or below their cloud point. Anionic surfactants are more water soluble than nonionic surfactants and will typically have much higher cloud points.

The present invention of an aqueous emulsion particle consolidation system is placed into the reservoir, where the fluid is heated to the reservoir temperature and the surfactant reaches its cloud point, loses its emulsifying characteristics and releases the resin and curing agents for binding the sand grains. The aqueous phase further serves as a spacer to maintain the permeability needed for the oil and gas production and no post flush is needed to flush away the excess resin and curing agent.

DETAILED DESCRIPTION

The present invention of an aqueous emulsion particle consolidation system involves a surfactant(s) that has a cloud point lower than the reservoir temperature in a water-based fluid as external phase, resin and curing agent as the internal phase, together to form an aqueous emulsion particle consolidation system. The reaction time of the resin and curing agent is delayed until the emulsion is delivered to the treatment area and heated to the cloud point of the surfactant. When the surfactant reaches its cloud point it loses its emulsifying characteristic and releases the resin and curing agent to consolidate the sand, proppants or any other material need to be consolidated. The water serves as a spacer to maintain the permeability required for oil and gas production after treatment. Unlike most prior art related to the subject, post flash is not required for the present invention to remove the excess resin/curing agent in order to maintain the permeability of the treatment area.

The composition of the present invention includes:

a) One or more surfactants, present from about 2 to 30 weight percent of the water phase, including but not limited to anionic surfactant, cationic surfactant, nonionic amphoteric surfactant and the combinations of two or more surfactants that have cloud points below the down hole application temperature.

b) One or more curable resins, present from about 20 to 50 weight percent, including but not limited to, bis-phenol A, bis-phenol F, cyclol aliphatic epoxides, glycidyl ethers, poly glycidyl ethers, resins derived from cashew nut oil, novalac resins, polyurethane resins, acrylic resin, phenol-formaldehyde resin, and epoxy functional resins, and combinations thereof.

c) One or more curing agents, present from about 5 to about 40 weight percent, depending on the molecular weight of the curing agent, including but not limited to, Lewis acids, tertiary amines, mono ethanol amine, benzyl dimethylamine, 1,4-diaza-bicylo[2,2,2]octane, 1,8-diazabicylo[5,4,0]undec-7ene, cycloaliphatic amines, amidoamines, aliphatic amines, aromatic amines, isophorone, Isophorone diamine, polyamides, boron tri-fluoride derivatives, functional resins, imidazoles, imidazolines, mercaptans, sulfide, hydrazides, amides and their derivatives, and combinations thereof.

d) Aqueous solvent, from about 50 to about 80 weight percent, including but not limited to fresh water, brine, synthetic brine, sea water, produced brine.

e) Optionally other additives, including but are not limited to, crosslinking agents, pH control agents, defoaming agents, fluid loss additives, corrosion inhibitors, biocides, that are generally used for purposes known to the art may be added.

The amount of surfactant is determined by the concentration necessary to emulsify the resin and curing agent. The amount of curing agent is determined by the amount of resin used so that the number of equivalents of each are approximately equal.

The process of the present invention includes preparing an aqueous emulsion particle consolidation composition containing:

a. One or more surfactants having a cloud point below the reservoir temperature,
b. One or more curable resins,
c. One or more curing agents,
d. An aqueous solvent.

dissolving the surfactant(s) in the aqueous solvent, mixing the resins and the curing agent in another container, mixing the surfactant solution and the resin/curing agent mixture to form a uniform water external emulsion, introducing the composition into a subterranean reservoir, and, allowing sufficient time for the composition to cure.

The aqueous emulsion particle consolidation system can also be added to a fracturing process with proppant during or at the end of the fracturing treatment to prevent proppant flow back after the fracturing treatment.

EXAMPLE

The example below is illustrative only. The present invention may be modified and practiced in different or equivalent ways apparent to those skilled in the art having the benefit of the teachings herein.

Example 1

6.0 grams of a nonionic surfactant having a cloud point of 28° C. are dissolved in 94.0 grams of Houston tap water.

In a separate container, 20.0 (0.111 Equivalents) grams Bisphenol A diglycidyl ether resin having an equivalent weight of 180 is mixed with 8.0 grams of a difunctional amidoamine having an EW of 70 (0.114 Equivalents) and slowly mixed for 3-5 minutes.

The surfactant solution is added to the resin/curing agent mixture and slowly mixed for 9-10 minutes until a uniform water external emulsion is formed.

Figure 2:
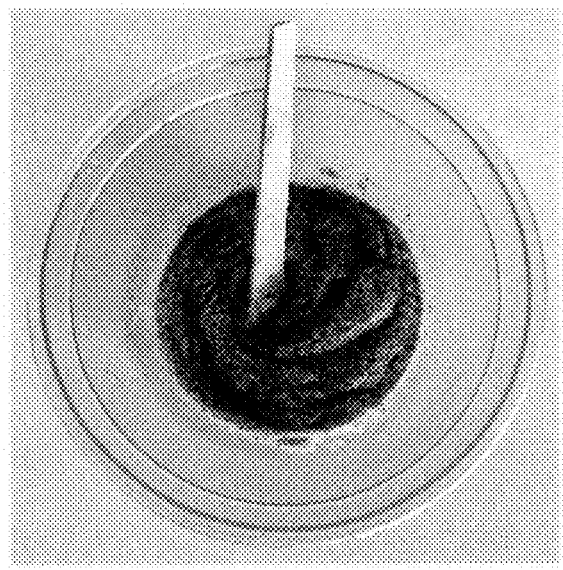
FIG. 2 Final mixture poured into mold before setting in a 90° C. oven for 15 hours.

The mixture is then poured into a mold and sand is added (FIG. 1) and slowly mixed for 2-4 minutes. (FIG. 2).

The mixture of sand and liquid is then placed in a 90° C. oven for 15 hours.

Figure 3:
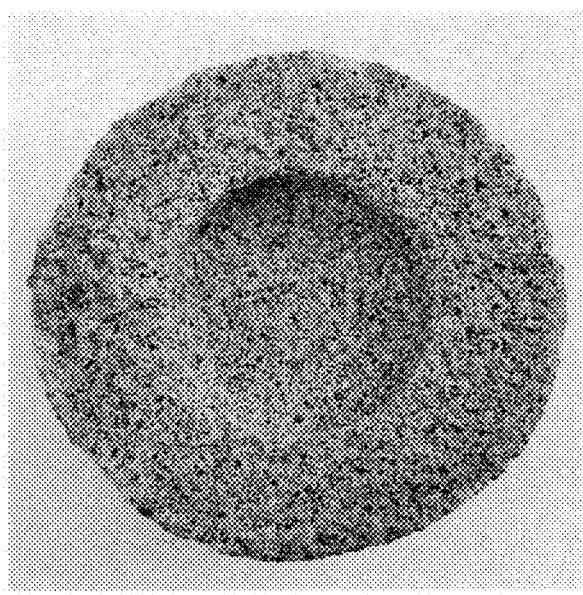
FIG. 3 Composition set up into a solid very hard block permeable to oil and water.
Figure 4:
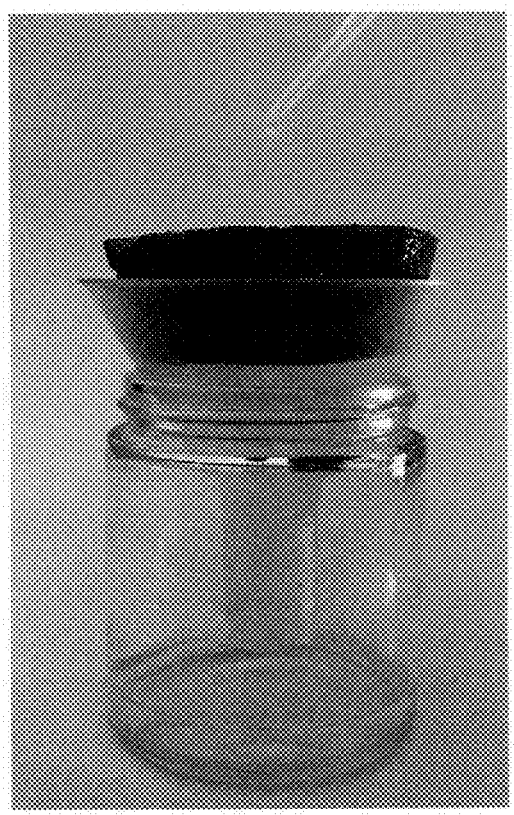
FIG. 4 Testing for permeability.

After 15 hours at 90° C., the mold is removed from the oven and the resulting hard block of consolidated sand (FIG. 3) is tested for permeability by allowing brine to flow through the block at ambient temperature and pressure (FIG. 4).

What is claimed:

1. A process for consolidating particles in a subterranean reservoir that involves preparing an aqueous emulsion composition containing
    a. one or more surfactants having a cloud point below the reservoir temperature;
    b. one or more resins;
    c. one or more curing agents;
    d. an aqueous solvent, dissolving the one or more surfactants in the aqueous solvent, mixing the one or more resins and the one or more curing agents together, mixing the aqueous solvent and the resin curing agent mixture to form a uniform water external emulsion, introducing the composition into a subterranean reservoir where the temperature is above the cloud point of the one or more surfactants; and; allowing for the composition to cure to consolidate the particles present.

2. The process described in claim 1 where the one or more surfactants having a cloud point below the reservoir temperature is selected from the group nonionic, anionic, cationic, amphoteric surfactant.

3. The process described in claim 1 where the one or more resins is selected from the group comprising bis-phenol A, bis-phenol F, cycloaliphatic epoxides, glycidyl ethers, poly glycidyl ethers, resins derived from cashew nut oil, novalac resins, polyurethane resins, acrylic resin, phenol-formaldehyde resin, functional resins, and combinations thereof.

4. The process described in claim 1 where the one or more curing agents is selected from the group comprising Lewis acids, tertiary amines, mono ethanol amine, benzyl dimethylamine, 1,4-diaza-bicylo[2,2,2] octane, 1,8-diazabicylo[5,4,0] undec-7ene, cycloaliphatic amines, amidoamines, aliphatic amines, aromatic amines, isophorone, Isophorone diamine, polyamides, boron tri-fluoride derivatives, functional resins, imidazoles, imidazolines, mercaptans, sulfide, hydrazides, amides and their derivatives, and combinations thereof.

5. The process described in claim 1 where the particles are sand.

6. The process described in claim 1 where the particles are proppants.

7. The process described in claim 1 where the one or more surfactants is dissolved in the aqueous solvent prior to adding to the mixture of one or more resins with one or more curing agents.

* * * * *